(12) United States Patent
Keltcher et al.

(10) Patent No.: US 6,779,100 B1
(45) Date of Patent: Aug. 17, 2004

(54) METHOD AND DEVICE FOR ADDRESS TRANSLATION FOR COMPRESSED INSTRUCTIONS

(75) Inventors: Paul Stanton Keltcher, Cupertino, CA (US); Stephen Eric Richardson, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/465,900

(22) Filed: Dec. 17, 1999

(51) Int. Cl.[7] .......................... G06F 12/10; G06F 13/00
(52) U.S. Cl. .................. 711/202; 711/125; 711/217; 711/220; 711/214; 712/230
(58) Field of Search ........................ 711/125, 152, 711/170–171, 202, 1, 3, 213, 217, 220, 118, 133–134, 154, 159, 214; 709/247; 712/204, 216–217, 213, 208, 230, 300; 710/68; 707/101; 708/203; 717/136

(56) References Cited

U.S. PATENT DOCUMENTS 6,216,213 B1 * 4/2001 Breternitz, Jr. et al. ..... 711/170
6,343,354 B1 * 1/2002 Breternitz, Jr. et al. ..... 711/201
6,353,871 B1 * 3/2002 Benveniste et al. ............ 711/3

* cited by examiner

*Primary Examiner*—Denise Tran

(57) ABSTRACT

A computer system for storing corresponding instruction blocks in a compressed form in a main memory and in an uncompressed form in an instruction cache. The instruction cache line addresses for the uncompressed instruction blocks in the instruction cache have an algebraic correlation to the main memory line addresses for the compressed instruction blocks in the main memory. Preferably, the instruction cache line addresses are proportional to the corresponding main memory line addresses.

24 Claims, 5 Drawing Sheets

METHOD AND DEVICE FOR ADDRESS TRANSLATION FOR COMPRESSED INSTRUCTIONS

BACKGROUND

1. Field of the Invention

This invention relates generally to computer systems that store instructions in memory in compressed and uncompressed form, and more particularly to computer systems that store instructions in compressed form in a main memory and store corresponding uncompressed instructions in an instruction cache.

2. Description of the Related Art

Computer systems store instructions in a main memory. Main memories tend to have a high capacity, but they also tend to be relatively slow to access. Also, the instructions can be stored in compressed form in order to increase the capacity of the main memory. However, the compression also slows access time because the compressed instructions must be decompressed before they can be processed.

Therefore, a faster cache memory is often employed to store certain frequently-used instructions. Instructions are stored in the cache memory in uncompressed form so that they can be accessed without being delayed by decompression pre-processing. However, cache memories generally have a more limited capacity and may be able to hold only some of the instructions of an ordered instruction set. Conventionally, when an instruction is called for that is not present in the cache, a cache miss operation (or miss to main memory operation) is executed and the instruction is accessed in compressed form from the main memory based on its expected address in the cache memory.

Instructions are typically grouped into instruction blocks and instruction pages. A program consists of an ordered list of instructions having virtual addresses 0 to n. In a typical RISC system, where each instruction is 32 bits long, a computer will group these instructions into instruction pages of 1024 instructions each. Typically, the instructions are also grouped into blocks so that there are 8 instructions per instruction block and 128 instruction blocks per page.

In most computers, instruction blocks have a fixed length, regardless of whether the instructions constituting the instruction block have a fixed instruction length.

An exemplary prior art computer system 100 is shown in FIG. 1. The computer system 100 includes main memory 102, instruction cache 104, instruction decompressor 106, address translation look-up table ATLT 108, and central processing unit (CPU) 112. As shown in FIG. 1, ordered, compressed instructions $CI_0$ to $CI_X$ are stored in main memory 102 so that they are scattered across main memory lines $MA_0$ to $MA_Y$. As explained in detail below, ATLT 108 controls the storage of compressed instructions CI so that these instructions take up as little of the available main memory space as possible.

Because the compression is approximately 50 percent, two compressed instruction blocks CI will usually be stored on one main memory line MA. For example, instruction blocks $CI_0$ and $CI_1$ are stored on a main memory line $MA_0$.

However, three or more compressed instruction blocks CI will be stored on a single main memory line MA, if they will fit. For example, instruction blocks $CI_2$, $CI_3$ and $CI_4$ are stored on main memory line $MA_1$. Also, sometimes it is only possible to fit a single instruction block CI on a main memory address line MA. For example, instruction block $CI_5$ is the only instruction block stored at main memory address line $MA_4$. Note that no compressed instruction blocks CI are stored at $MA_2$ or $MA_3$ because these lines are unavailable due to the fact that these addresses are being used to store other unrelated data.

Before the compressed instruction blocks $CI_0$ to $CI_X$ are to be used by CPU 112, they are first translated into uncompressed form by instruction decompressor 106 and stored in instruction cache 104 as corresponding uncompressed instruction blocks having physical addresses $UI_0$ to $UI_X$. As shown in FIG. 1, the uncompressed instruction blocks $UI_0$ to $UI_X$ are stored in instruction cache 104 so that each uncompressed instruction block UI is stored on a single line I$ of instruction cache 104. In order to simplify this example, $UI_0$ to $UI_X$ are stored in order at consecutive cache lines $I\$_0$ to $I\$_X$.

When a miss to main memory 102, such as an instruction cache miss, is executed in prior art computer system 100, the missing instruction UI is translated by address lookup table 108 into a main memory line address MA, so that the uncompressed instruction block $UI_n$, which is supposed to be stored at information cache line address $I\$_n$, can be found in compressed form $CI_n$ at the corresponding main memory address $MA_{nn}$ (where n is any one of the ordered instruction blocks from 0 to X, and nn depends on how the compressed instructions CI are scattered through the main memory 102). For example, an instruction cache miss of instruction block $UI_5$ involves sending $UI_5$ to address translation look-up table 108. Address translation look-up table 108 translates the uncompressed address $UI_5$ into the corresponding main memory compressed address $MA_4$ because that is where the corresponding compressed instruction block $CI_5$ is stored in main memory 102.

Translator 108 employs an address look-up table because there is no predictable correlation between addresses in the uncompressed space of information cache 104 and corresponding addresses of the compressed space in main memory 102. Address look-up table 108 takes space and time to initiate, maintain and utilize. This can result in complicated and expensive computer hardware and relatively high silicon cost.

SUMMARY OF THE INVENTION

According to the present invention, there is an "algebraic" relationship between memory line addresses for instruction blocks stored in uncompressed form (for example, in an instruction cache) and corresponding memory line addresses for corresponding instruction blocks stored in compressed form (for example, in a main memory). Preferably, some set integral number n of compressed instruction blocks is stored on each line of main memory, with the instruction blocks being placed in consecutive order on consecutive memory lines. In this way, line addresses in uncompressed memory space will be easy to translate to compressed addresses because uncompressed addresses will be proportional to the corresponding compressed memory addresses. Even more preferably, two instructions are stored on each consecutive line of compressed memory, because it is relatively easy to reliably utilize this two-instructions-per-line scheme, even when the compression is as low as 50 percent.

As stated above, there is an "algebraic" relationship between memory line addresses in uncompressed space and corresponding memory line addresses in compressed space. As used herein, "algebraic" refers to any mathematical function or combination of mathematical functions commonly implemented on computers. Such mathematical functions include but are not limited to addition, subtraction, multiplication, division, rounding to an integer value, exponents, factorials, logarithms, trigonometric functions and so on.

It is noted that, after compression, instruction blocks often vary in length, and the predetermined number n of instruction blocks may not fit on a single line of compressed memory space when dealing with a longer-than-expected instruction block. One solution to this problem is to set n sufficiently low so that the predetermined number of instruction blocks n will always fit in the compressed memory space. The drawback to the solution is that decreasing n will increase the amount of compressed memory space that is required. Also, n cannot be less than two.

In at least some embodiments of the present invention, a different solution is used. More particularly, a flag and a pointer are stored in compressed memory in the location which had been allocated for the longer-than-expected instruction block. The pointer points to another line address of the compressed memory where the longer-than-expected instruction block has been alternatively stored, where it is out of the way of the set of compressed addresses that follow an algebraic pattern for ease of uncompressed-to-compressed address translation.

BRIEF DESCRIPTION OF THE DRAWING

The objects, advantages and features of the present invention will become more readily apparent from the following detailed description, when taken together with the accompanying drawing, in which.

DETAILED DESCRIPTION OF THE PREFERRED EMBODIMENTS

Figure 2:
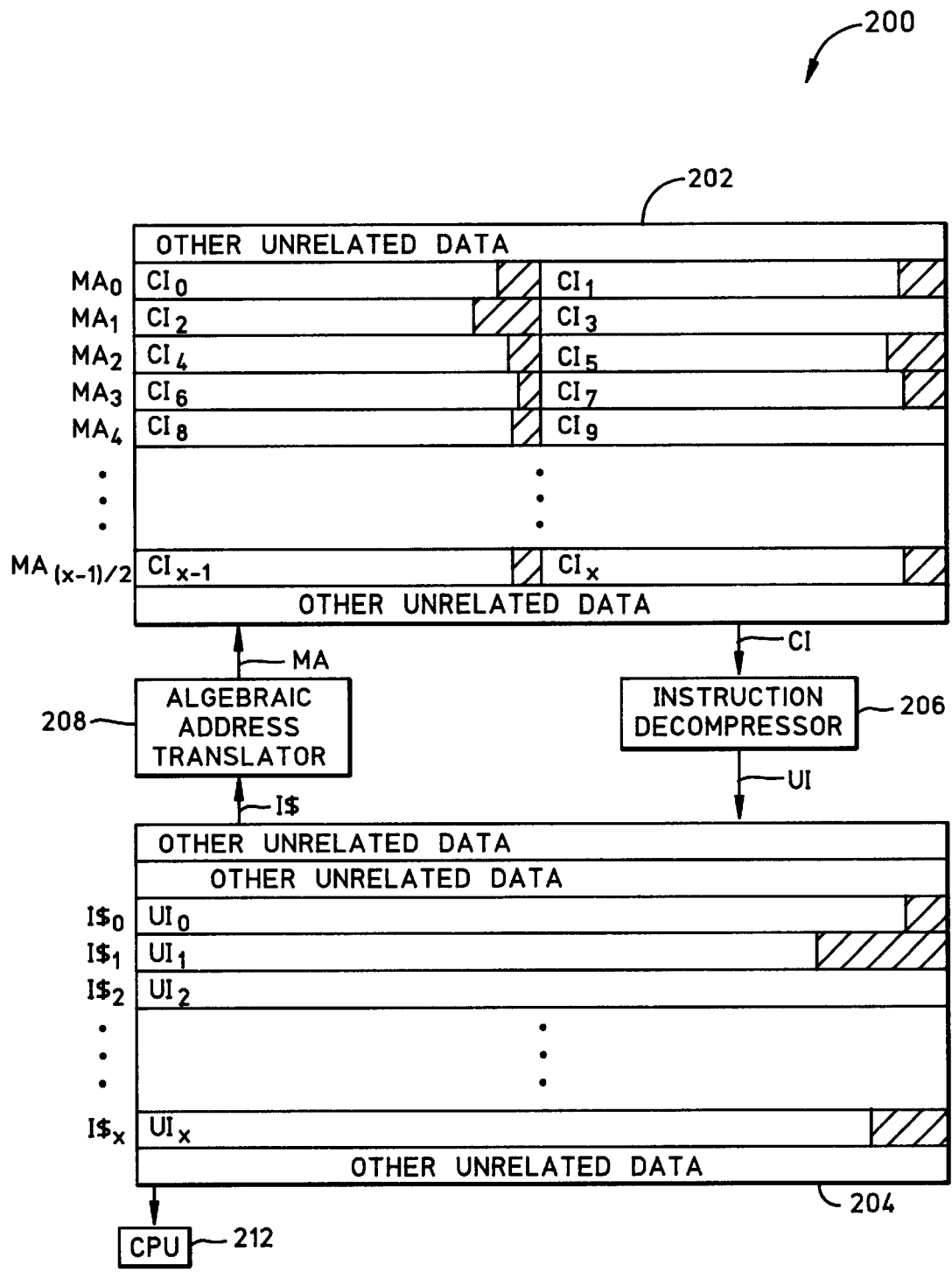
FIG. 2 is a block diagram of a first embodiment of a computer system according to the present invention having corresponding instruction blocks stored in compressed and uncompressed memory space.

A first embodiment of computer system 200 according to present invention will now be described with reference to FIG. 2. Computer system 200 includes main memory 202, instruction cache 204, instruction decompressor 206, algebraic address translator 208 and CPU 212.

Main memory 202 may be constructed as any sort of data hierarchy which is found above an instruction cache. Main memory 202 is divided into memory lines. In this example, each line of main memory 202 is 32 bytes long. The addresses of the relevant lines of main memory, where compressed instruction blocks $CI_{0 \ldots x}$ are stored, are $MA_0$, $MA_1$, $MA_2$, $MA_3$, ..., $MA_{(x-1)/2}$. Other lines of main memory 202 may contain other unrelated data. Main memory 202 is referred to as compressed memory or compressed space, because the instruction blocks are stored here in compressed form.

Instruction cache 204 is also divided into memory lines of 32 bytes apiece. In this example, uncompressed instruction blocks $UI_{0 \ldots x}$ are respectively stored in instruction cache 204 at line addresses $I\$_{0 \ldots x}$ in uncompressed form. It is noted that uncompressed instructions block physical addresses $UI_{0 \ldots x}$ can be mapped to cache lines I$ in other, more complicated ways, in which case a look-up table may be used to correlate uncompressed memory space with lines I$ of the cache. Uncompressed instruction blocks $UI_{0 \ldots x}$ can be quickly accessed y CPU 212 for use in processing instructions during computer operations. In this example, each uncompressed instruction block $UI_{0 \ldots x}$ has a fixed length of 32 bytes, and therefore, completely fills one 32-byte-long line I$ of cache memory.

As further explained below, the compressed instruction blocks $CI_{0 \ldots x}$ are first stored in main memory 202. When it is anticipated that CPU 212 will need the instructions, compressed instructions CI are sent to instruction decompressor 206, where they are converted to uncompressed instruction blocks UI. Uncompressed instruction blocks UI are sent on to instruction cache 204.

The compressed ordered instruction blocks $CI_0$ through $CI_x$ are stored so that two consecutive, compressed instruction blocks CI occupy each line of compressed memory space. For example, $CI_0$ and $CI_1$ occupy $MA_0$, $CI_2$ and $CI_3$ occupy $MA_1$, and so on down to $CI_{(x-1)}$ and $CI_x$ occupying $MA_{(x-1)/2}$.

In this embodiment, the first instruction block on a compressed memory line MA is allocated the first 16 bytes of the 32 byte line. The following instruction is allocated the second 16 bytes of the 32 byte line. As shown in FIG. 2, compressed instruction block $CI_3$ occupies its full 16 byte allocation. The other compressed instruction blocks do not quite fill their 16 byte allocations.

This allocation scheme makes especially efficient use of compressed memory space when compression is slightly better than 50%. This is because under 50 percent compression, an instruction block that is 32 bytes or less long will generally be compressed down to 16 bytes or less, which corresponds to one-half of a line of compressed memory space. If the compression is greater than 50 percent, then a compressed instruction block will not fit in one-half of a line of uncompressed memory space (some fixes for this potential problem are discussed below). On the other hand, if the compression is much less than 50 percent, then the compressed instruction blocks CI will take only a small part of their 16 byte allocations. This is not an efficient use of compressed memory space, and therefore, it might be preferable to put more than two compressed instruction blocks CI on each line of compressed memory under these conditions, as described below in more detail in connection with the embodiment of FIG. 3.

Once the compressed instruction blocks CI are stored in main memory 202, it is a straightforward process to decompress the instructions into uncompressed form UI so that the uncompressed instruction blocks are stored on consecutive lines $I\$_0$ to $I\$_x$ in instruction cache 204. A large advantage of the above-described main memory 202 and instruction cache 204 is the simplification of translation of line addresses of corresponding instruction blocks from uncompressed memory space UI to compressed memory space MA. This simplified translation will be discussed below in connection with an instruction cache miss operation.

The instruction cache miss operation is initiated when instruction cache memory sends to algebraic address translator 208 the uncompressed space address UI corresponding to one of the uncompressed instruction blocks in instruction cache 204. Algebraic address translator 208 translates this address into a compressed space address of the line of main memory 202 that holds the compressed version of the corresponding instruction block. Algebraic address translator 208 performs this translation by utilizing the algebraic relationship between uncompressed space addresses and compressed space addresses.

Figure 1:
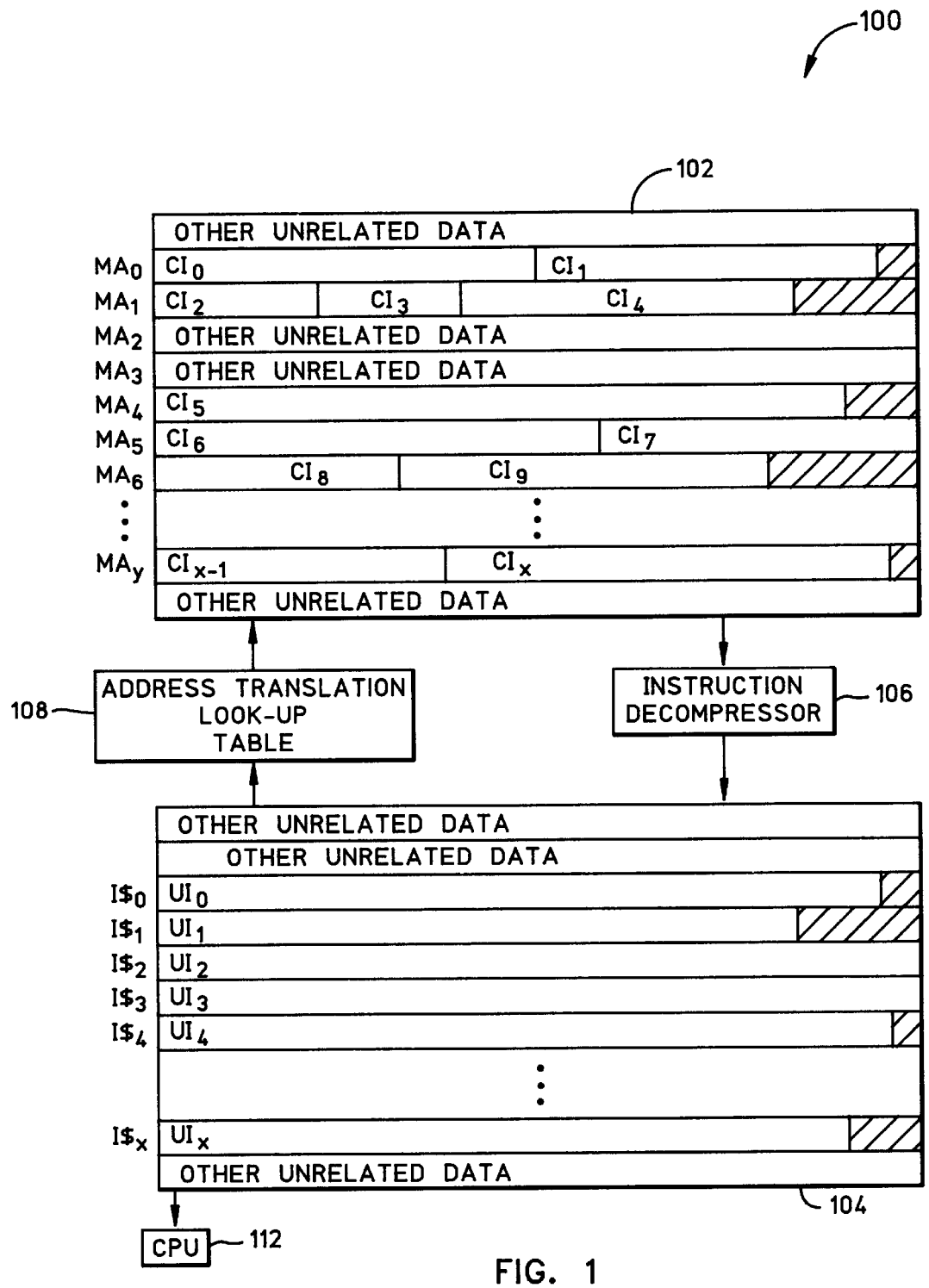
FIG. 1 is a block diagram of a prior art computer system having corresponding instruction blocks stored in compressed and uncompressed memory space.

In this example, the algebraic relationship for any uncompressed space line address $UI_i$ to its corresponding compressed space line address $MA_j$ is:

$$MA_j = MA_0 + \text{Round}((UI_i)/2) \quad (1)$$

where "Round" is a mathematical function that rounds down to the next lowest integer. Algebraic address translator 208 only needs to know the value of $MA_0$, $UI_i$ and the algebraic relationship. Generally, algebraic address translator 208 will therefore will require much less area and time than a look-up table (for example, look-up table 108 in FIG. 1) that would individually store individual correlations for a large multiplicity of instructions.

Figure 3:
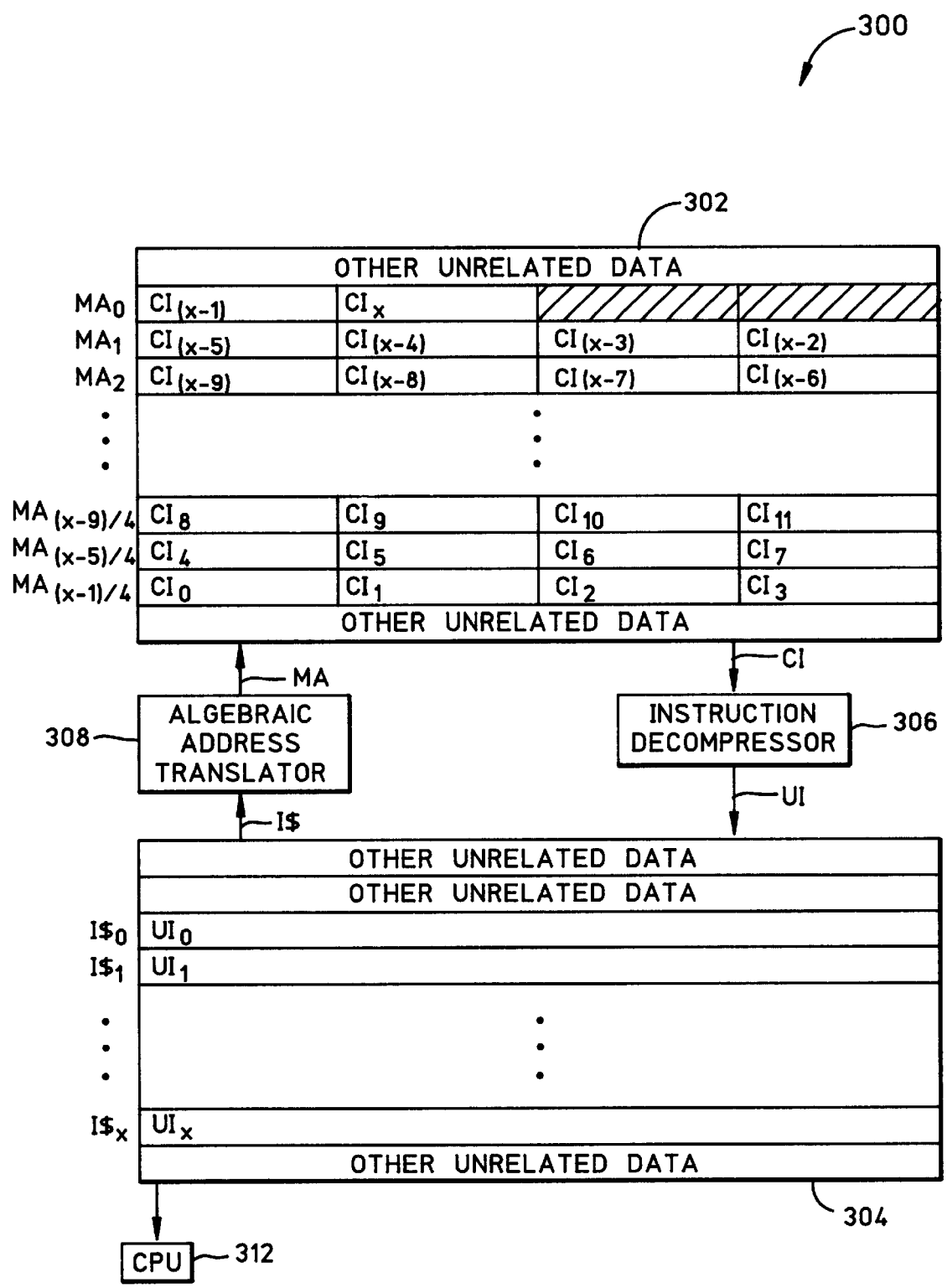
FIG. 3 is a block diagram of a second embodiment of a computer system according to the present invention having corresponding instruction blocks stored in compressed and uncompressed memory space.

FIG. 3 is a second embodiment according to the present invention. Computer system 300 includes main memory 302, instruction cache 304, instruction decompressor 306, algebraic address translator 308 and CPU 312. Instruction cache 304, instruction decompressor 306 and CPU 312 operate similarly to their corresponding elements in previously-described computer system 200 in FIG. 2.

However, in computer system 300 the instruction compression is slightly better than 25 percent. Therefore, four instruction blocks can be packed onto each 32 byte line MA of main memory 302. Also, the instruction blocks are stored in reverse order in main memory 302 in order to illustrate some of the possible variety that the algebraic relationship between uncompressed memory space and compressed memory space can have.

In computer system 300, algebraic address translator 308 controls the storage of compressed instruction blocks CI in main memory 302 so that the ordered compressed instruction blocks $CI_0$ to $CI_X$ are stored four per line in reverse order on consecutive memory lines $MA_0$ to $MA_{(X-1)/4}$. Accordingly, each 32 byte maximum uncompressed instruction block UI is allocated 8 bytes of compressed memory space in main memory 302.

Again in this example, compressed instruction blocks CI are stored in the compressed memory space and uncompressed instruction blocks UI are stored in the uncompressed memory space so that there is an algebraic correlation between addresses of instruction cache 304 and corresponding addresses of main memory 302. For computer system 300, this correlation is:

$$MA_j = MA_{(X-1)/4} - \text{Round}((UI_i)/4) \quad (2)$$

Equation (2) is the correlation applied by algebraic address translator 308 during an instruction cache miss operation in order to determine an address for compressed memory space MA based on an address for uncompressed memory space $UI_i$.

Figure 4:
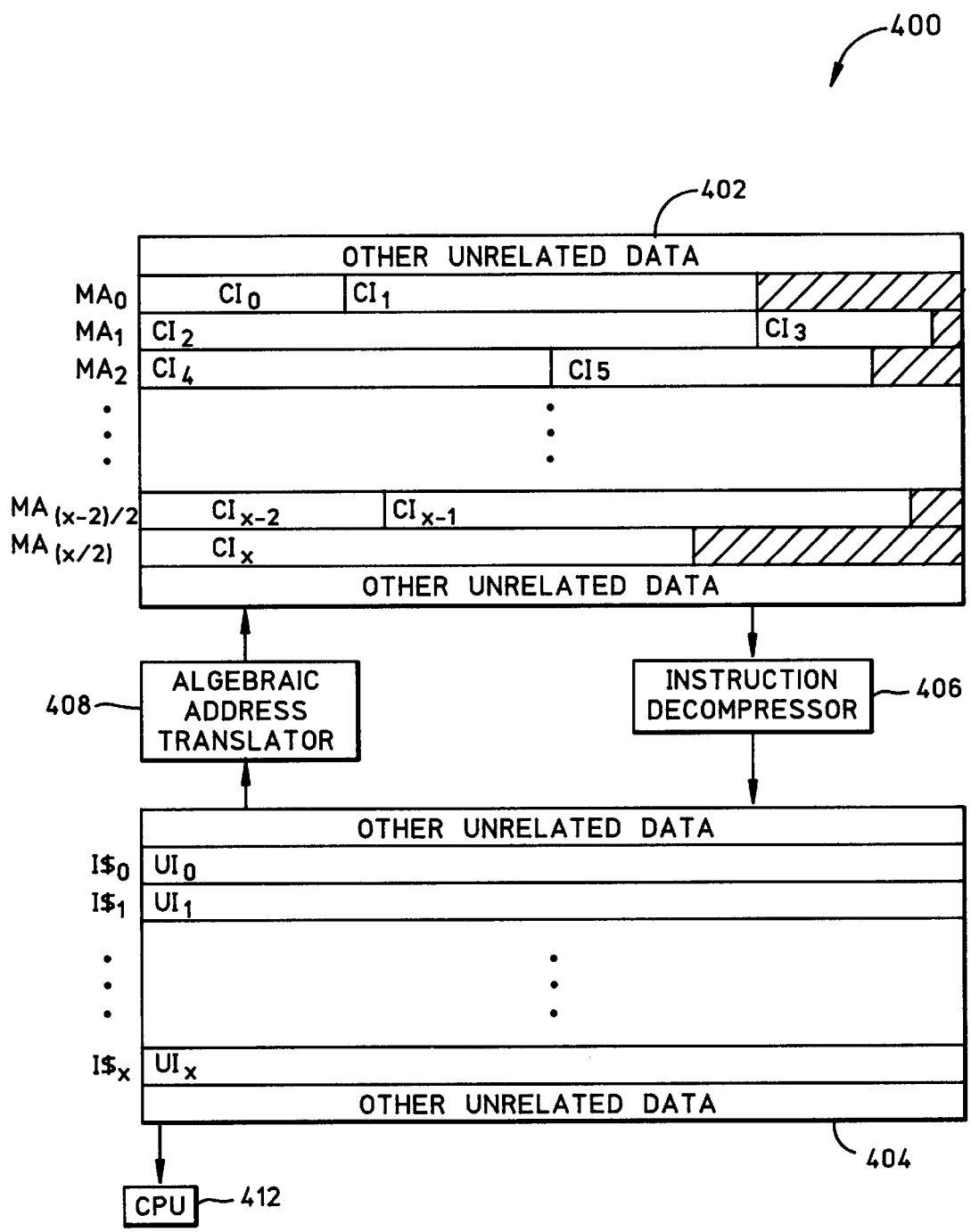
FIG. 4 is a block diagram of a third embodiment of a computer system according to the present invention having corresponding instruction blocks stored in compressed and uncompressed memory space.

FIG. 4 shows in a third embodiment, computer system 400 according to present invention. Computer system 400 includes main memory 402, instruction cache 404, instruction decompressor 406, algebraic address translator (AAT) 408 and CPU 412. Computer system 400 is similar to above-described computer system 200 (FIG. 2) in that it has approximately 50 percent compression and stores two compressed instruction blocks CI on each line of compressed memory space in main memory 402.

However, in computer system 400, AAT 408 controls storage of compressed instruction blocks CI in main memory 402 so that the second instruction block on a line of main memory 402 starts directly after and abuts the previous compressed instruction. For example, $CI_1$ is stored immediately after $CI_0$. This abutting storage scheme can help ensure that two compressed instruction blocks will fit on a single main memory line.

For example, as explained in connection with computer system 200, under that scheme every 32 byte uncompressed instruction block UI had to be compressed down to a 16 byte maximum in main memory 202. On the other hand, in computer system 400, there is a less rigorous requirement that each pair of two consecutive instructions be compressed down to a 32 byte maximum (corresponding to one line of main memory 402). To illustrate this added flexibility, compressed instruction block $CI_2$ (shown in FIG. 4) takes more than 16 bytes of main memory 402 line $MA_1$. However, because $CI_3$ takes up less than 16 bytes, both of these instruction blocks can fit on line $MA_1$.

Figure 5:
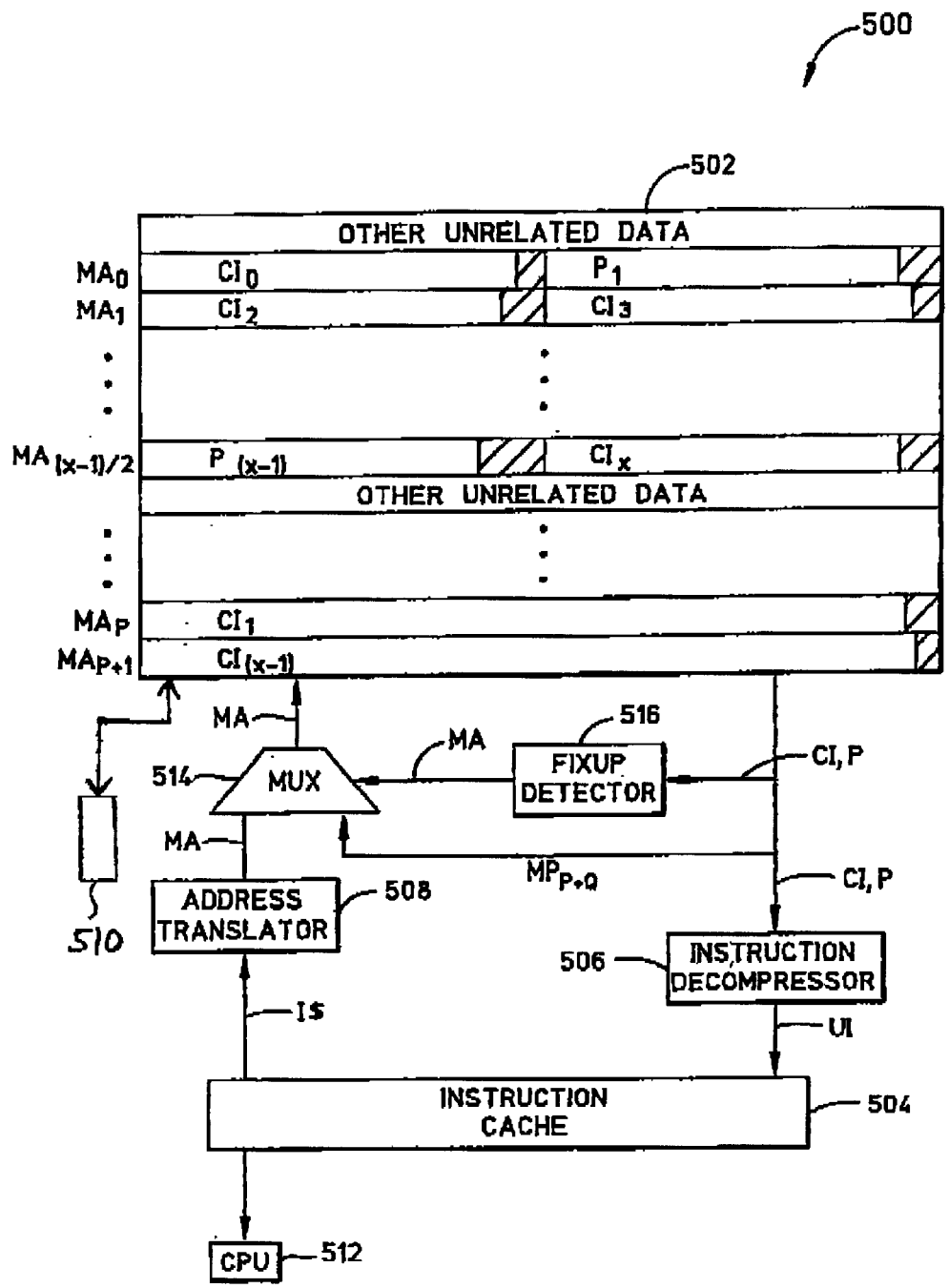
FIG. 5 is a block diagram of a fourth embodiment of a computer system according to the present invention having corresponding instruction blocks stored in compressed and uncompressed memory space.

FIG. 5 is a fourth embodiment according to present invention. Computer system 500 includes main memory 502, instruction cache 504, instruction decompressor 506, algebraic address translator 508 and CPU 512. Computer system 500 further includes multiplexer 514 and fixup detector 516. Computer system 500 is similar to above-described computer system 200 (FIG. 2) in that it has approximately 50 percent compression. This computer system generally stores a first compressed instruction block CI within the first 16 bytes of each memory line MA of compressed memory and a following compressed instruction block within the last 16 bytes of each compressed memory line.

However, as stated above, some of the compressed instruction blocks may require more than 16 bytes of compressed storage, especially if the compression factor is only 50 percent or slightly greater. Computer system 500 handles this problem by using pointers $P_1$, $P_{(X-1)}$ in the place of overly-long compressed instruction blocks $CI_1$, $CI_{(X-1)}$ in compressed memory 502. The pointers P1 and $P_{(X-1)}$ each include some flag data to indicate that they are indeed pointers, as opposed to compressed instructions. The pointers $P_1$ and $P_{(X-1)}$ further respectively include line addresses $MA_P$ and $MA_{P+1}$, for other lines in compressed memory 502 where compressed instruction blocks $CI_1$ and $CI_{(X-1)}$ have been alternatively stored.

Because entire lines of compressed memory $MA_P$ and $MA_{P+1}$, have respectively been allocated for overly-long instruction blocks $CI_1$ and $CI_{(X-1)}$, these instructions do not need to be squeezed into the 16 byte allocations set aside for the bulk of the compressed instruction blocks CI. Compressed memory addresses $MA_P$ and $MA_{P+1}$, are chosen by memory controller 510 so that they are out of the way of the other compressed instructions stored on lines $MA_0 \ldots MA_{(X-1)/2}$, and out of the way of other, unrelated data stored in compressed memory 502.

Now an instruction cache miss operation for uncompressed instruction block $UI_1$ will be described. Uncompressed instruction block $UI_1$ is stored at instruction cache line address $I\$_1$. Address $UI_1$ is sent to address translator 508, which applies the algebraic correlation of equation (1) to determine corresponding compressed memory line address $MA_0$. Address $MA_0$ is sent through multiplexer 514, and line $MA_0$ of compressed memory 502 is accessed to get compressed instruction block $CI_1$.

However, pointer $P_1$ is stored at line $MA_0$ in the place of $CI_1$, because $CI_1$ is one of the overly-long instruction blocks. Compressed memory 502 sends pointer $P_1$ out to instruction decompressor 506 and fixup detector 516. Fixup detector 516 recognizes that $P_1$ is a pointer, rather than a compressed instruction based on the flag data present in pointer $P_1$. Fixup detector 516 responds by sending compressed memory address $MA_P$, which corresponds to the compressed memory address data in pointer $P_1$, to multiplexer 514. Multiplexer 514 sends along the corrected address $MA_P$, so that compressed memory line $MA_P$ is accessed to finally get to the overly-long compressed instruction block $CI_1$.

Then, compressed instruction block $CI_1$ is sent to fixup detector 516 and instruction decompressor 506. Fixup detector 516 ignores compressed instruction block $CI_1$ because this compressed instruction block will not have any of the flag data that fixup detector 516 looks for. However, instruction decompressor 506 will be able to decompress compressed instruction block $CI_1$ into corresponding uncompressed instruction block $UI_1$. Uncompressed instruction block $UI_1$ is then sent along to instruction cache 504. In this way, an efficient correction can be effected when a relatively small number of overly-long instruction lines do not fit within the algebraic scheme for packing the compressed memory space with compressed instructions.

Although the above-described, preferred embodiments generally show uncompressed instruction blocks on consecutive lines of the instruction cache, and compressed instruction blocks on consecutive lines of the compressed memory, this consecutive allocation may not be necessary. For example, suppose the algebraic correlation between the uncompressed memory lines and the compressed memory lines is:

$$MA_j = MA_0 + (\text{Round}((UI_i)/2))^3 \tag{3}$$

In this case, the program will not be stored on consecutive compressed memory lines, but rather will be spaced out based on the cubic exponential relationship given in equation (3).

Certain embodiments have been described above. It is likely that there are modifications and improvements to these embodiments which are within the literal scope or are equivalents of the claims which follow.

What is claimed is:

1. A computer system that operates by processing coded sets of instructions, the system comprising:

a first memory organized into first memory lines with each first memory line having a first memory line address, the first memory being structured to store a plurality of ordered instruction blocks In compressed form so that an integer number n of compressed instruction blocks occupy one first memory line, where n is greater than one;

a second memory organized into second memory lines with each second memory line having a second memory line address, the second memory being structured to store the plurality of ordered instruction blocks in uncompressed form so that each uncompressed instruction block occupies one second memory line; and an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored, where the algebraic correlation is applied during an instruction cache miss operation to determine a first memory line address based on a second memory line address, wherein:

n is equal to two or more; and the algebraic correlation between each second memory line address and the corresponding first memory line address is:

N+Round((second memory line address)/n)=(first memory line address) where N is an integer.

2. The computer system according to claim 1, wherein:

the first memory comprises a main memory; and the second memory comprises an instruction cache.

3. The computer system according to claim 1, wherein:

n is equal to four; and the algebraic correlation between each second memory line address and the corresponding first memory line address is:

N+Round((second memory line address)/4)=(first memory line address) where N is an integer.

4. The computer system according to claim 1, wherein:

n is equal to two;

the start of each even-numbered compressed instruction block stored in the first memory coincides with the start of a first memory line;

the start of each odd-numbered compressed instruction block abuts the end of a previous even-numbered compressed instruction block.

5. The computer system according to claim 1, wherein:

n is equal to two;

the start of every even-numbered compressed instruction block stored in the first memory coincides with the start of a first memory line; and each odd-numbered compressed instruction block stored in the first memory occupies a predetermined portion at the end of a first memory line.

6. The computer system according to claim 1, wherein the address translator is structured to receive an uncompressed miss address value corresponding to a second memory line address of an uncompressed instruction in the second memory, and to determine a compressed miss address value corresponding to a first memory line address of the corresponding compressed instruction in the first memory on the basis of the algebraic correlation.

7. The computer system according to claim 6 wherein:

n is equal to two; and the algebraic correlation between each second memory line address and the corresponding first memory line address is:

N+Round((second memory line address)/2)=(first memory line address) where N is an integer;

the address translator determines the compressed miss signal address using the following equation:

(compressed miss address value)=N+Round((uncompressed miss address value)/2).

8. A computer system that utilizes instructions, the system comprising:

a first memory organized into first memory lines with each first memory line having a first memory line address, the first memory being structured to store a plurality of ordered Instruction blocks In compressed form and to store pointers so that n data portions occupy one first memory line, where n is greater than one and each data portion is one of a compressed instruction block and a pointer, where each pointer corresponds to a location in the first memory where a compressed instruction block is stored;

a second memory organized into second memory lines with each second memory line having a second memory line address, the second memory being structured to store the plurality of ordered instruction blocks in uncompressed form so that each uncompressed instruction block occupies one second memory line;

an algebraic address translator structured to control the storage of the compressed instruction blocks and pointers in the first memory and the second memory so that each second memory line address where an uncompressed instruction block is stored has an algebraic correlation with a corresponding first memory line address where a corresponding data portion is stored; and a fixup detector that determines whether the corresponding data portion is a corresponding compressed instruction block or a pointer that corresponds to a first memory location where a corresponding compressed instruction block is stored.

9. The computer system of claim 8 wherein the fixup detector is structured to receive a data portion from the first memory and to determine whether the data portion is a compressed instruction block or a pointer.

10. The computer system of claim 9, further comprising a multiplexer structured to receive a pointer from the fixup detector and to access a compressed instruction block in the first memory stored at a location indicated by the pointer.

11. The computer system according to claim 8 wherein:
the compression is approximately 50 percent compression;
n is equal to two; and
the algebraic correlation between each second memory line address and the corresponding first line address having a corresponding data portion is:
N+Round((second memory line address)/2=(first memory line address) where N is an integer.

12. A method for correlating a set of instruction blocks in a compressed memory space and an uncompressed memory space, the method comprising the steps of:
providing a set of ordered instructions, a compressed memory and an uncompressed memory;
storing the set of ordered instruction blocks in the uncompressed memory in uncompressed form;
storing the set of ordered instruction blocks in the compressed memory in compressed format so that there is an algebraic correlation between locations of corresponding ordered instruction blocks in the compressed memory and the uncompressed memory, where the algebraic correlation is applied during an instruction cache miss operation to determine an address for a compressed memory space based on an address for an uncompressed memory space, wherein the algebraic correlation is:
N+Round((uncompressed memory location)/2)= (compressed memory location)
where N is an integer.

13. The method of claim 12, further comprising the following steps:
providing a location of an uncompressed instruction block during a cache miss operation;
translating the location of the uncompressed instruction block to a location of the corresponding, compressed instruction block in the compressed memory by using the algebraic correlation between the uncompressed memory and the compressed memory.

14. The method of claim 12, further comprising the following steps:
determining that an overly-long compressed instruction block is too long to fit at a location in the compressed memory selected based on the algebraic correlation between the uncompressed memory and the compressed memory;
storing a pointer, rather than the overly-long compressed instruction block, at the compressed memory selected based on the algebraic correlation between the uncompressed memory and the compressed memory, where the pointer indicates some other location in the compressed memory where there is sufficient space to store the overly-long compressed instruction block; and
storing the overly-long compressed instruction block at the location indicated by the pointer.

15. The method according to claim 14 further comprising the steps of:
accessing a predetermined location in the compressed memory;
determining whether the data at the predetermined location is a compressed instruction block or a pointer; and
accessing a pointer location indicated by the pointer on condition that the data at the predetermined location is determined to be a pointer.

16. A computer system that operates by processing coded sets of instructions, the system comprising:
a first memory organized into first memory lines with each first memory line having a first memory line address, the first memory being structured to store a plurality of ordered instruction blocks in compressed form so that an integer number n of compressed instruction blocks occupy on first memory line, where n is greater than one;
a second memory organized into second memory lines with each second memory line having a second memory line address, the second memory being structured to store the plurality of ordered instruction blocks in uncompressed form so that each uncompressed instruction block occupies one second memory line; and
an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored;
wherein n is equal to two; and
the algebraic correlation between each second memory line address and the corresponding first memory line address is:
N+Round((second memory line address)/2)=(first memory line address) where N is an integer.

17. A computer system that operates by processing coded sets of instructions, the system comprising:
a first memory organized into first memory lines with each first memory line having a first memory line address, the first memory being structured to store a plurality of ordered instruction blocks in compressed form so that an integer number n of compressed instruction blocks occupy one first memory line, where n is greater than one;

a second memory organized into second memory lines with each second memory line having a second memory line address, the second memory being structured to store the plurality of ordered instruction blocks in uncompressed form so that each uncompressed instruction block occupies one second memory line; and an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored;

wherein n is equal to four; and the algebraic correlation between each second memory line address and the corresponding first memory line address is:

N+Round((second memory line address)/4)=(first memory line address) where N is an integer.

18. A computer system that operates by processing coded sets of instructions, the system comprising:

a first memory organized into first memory lines with each first memory line having a first memory line address, the first memory being structured to store a plurality of ordered instruction blocks in compressed form so that an integer number n of compressed instruction blocks occupy one first memory line, where n is greater than one;

a second memory organized into second memory lines with each second memory line having a second memory line address, the second memory being structured to store the plurality of ordered instruction blocks in uncompressed form so that each uncompressed instruction block occupies one second memory line; and an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored;

wherein n is equal to two;

the start of each even-numbered compressed instruction block stored in the first memory coincides with the start of a first memory line; and the start of each odd-numbered compressed instruction block abuts the end of a previous even-numbered compressed instruction block.

19. A computer system that operates by processing coded sets of instructions, the system comprising:

a first memory organized into first memory lines with each first memory line having a first memory line address, the first memory being structured to store a plurality of ordered instruction blocks in compressed form so that an integer number n of compressed instruction blocks occupy one first memory line, where n is greater than one;

a second memory organized into second memory lines with each second memory line having a second memory line address, the second memory being structured to store the plurality of ordered instruction blocks in uncompressed form so that each uncompressed instruction block occupies one second memory line; and an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored;

wherein n is equal to two;

the start of each even-numbered compressed instruction block stored in the first memory coincides with the start of a first memory line; and each odd-numbered compressed instruction block stored in the first memory occupies a predetermined portion at the end of a first memory line.

20. A computer system that operates by processing coded sets of instructions, the system comprising:

a first memory organized into first memory lines with each first memory line having a first memory line address, the first memory being structured to store a plurality of ordered instruction blocks in compressed form so that an integer number n compressed instruction blocks occupy one first memory line, where n is greater than one;

a second memory organized into second memory lines with each second memory line having a second memory line address, the second memory being structured to store the plurality of ordered instruction blocks in uncompressed form so that each uncompressed instruction block occupies one second memory line; and an algebraic address translator structured to control the storage of the compressed instruction blocks in the first memory and the second memory so that each second memory line address where an uncompressed instruction block is stored has an algebraic correlation with a corresponding first memory line address where the corresponding compressed instruction block is stored;

wherein the address translator is structured to receive an uncompressed miss address value corresponding to a second memory line address of an uncompressed instruction in the second memory, and to determine a compressed miss address value corresponding to a first memory line address of the corresponding compressed instruction in the first memory on the basis of the algebraic correlation, wherein:

n is equal to two; and the algebraic correlation between each second memory line address and the corresponding first memory line address is:

N+Round((second memory line address)/2)=(first memory line address) where N is an integer;

the address translator determines the compressed miss signal address using the following equation:

(compressed miss address value)=N+Round ((uncompressed miss address value)/2).

21. A method for correlating a set of instruction blocks in a compressed memory space and an uncompressed memory space, the method comprising the steps of:

providing a set of ordered instructions, a compressed memory and an uncompressed memory;

storing the set of ordered instruction blocks in the uncompressed memory in uncompressed form;

storing the set of ordered instruction blocks in the compressed memory in compressed format so that there is an algebraic correlation between locations of corresponding ordered instruction blocks in the compressed memory and the uncompressed memory;

wherein the algebraic correlation is:

N+Round((uncompressed memory location)/2)= (compressed memory location) where N is an integer.

22. A method for correlating a set of instruction blocks in a compressed memory space and an uncompressed memory space, the method comprising the steps of:

providing a set of ordered instructions, a compressed memory and an uncompressed memory;

storing the set of ordered instruction blocks in the uncompressed memory in uncompressed form;

storing the set of ordered instruction blocks in the compressed memory in compressed format so that there is an algebraic correlation between locations of corresponding ordered instruction blocks in the compressed memory and the uncompressed memory;

determining that an overly-long compressed instruction block is too long to fit at a location in the compressed memory selected based on the algebraic correlation between the uncompressed memory and the compressed memory;

storing a pointer, rather than the overly-long compressed instruction block, at the compressed memory selected based on the algebraic correlation between the uncompressed memory and the compressed memory, where the pointer indicates some other location in the compressed memory where there is sufficient space to store the overly-long compressed instruction block; and storing the overly-long compressed instruction block at the location indicated by the pointer.

23. The method claim 22, further comprising:

accessing a predetermined location in the compressed memory;

determining whether the data at the predetermined location is a compressed instruction block or pointer; and accessing a pointer location indicated by the pointer on condition that the data at the predetermined location is determined to be a pointer.

24. A method for correlating a set of instruction blocks in a compressed memory space and an uncompressed memory space, the method comprising the steps of:

providing a set of ordered instructions, a compressed memory and an uncompressed memory;

storing the set of ordered instruction blocks in the uncompressed memory in uncompressed form;

storing the set of ordered instruction blocks in the compressed memory in compressed format so that there is an algebraic correlation between locations of corresponding ordered instruction blocks in the compressed memory and the uncompressed memory;

providing a location of an uncompressed instruction block during a cache miss operation;

translating the location of the uncompressed instruction block to a location of the corresponding compressed instruction block in the compressed memory by using the algebraic correlation between the uncompressed memory and the compressed memory, wherein the algebraic correlation is:

N+Round((uncompressed memory location)/2)= (compressed memory location)

where N is an integer.

* * * * *